US006545683B1

(12) United States Patent
Williams

(10) Patent No.: US 6,545,683 B1
(45) Date of Patent: Apr. 8, 2003

(54) APPARATUS AND METHOD FOR INCREASING THE BANDWIDTH TO A GRAPHICS SUBSYSTEM

(75) Inventor: Ian M. Williams, Sunnyvale, CA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/293,869

(22) Filed: Apr. 19, 1999

(51) Int. Cl.[7] .......................... G06T 15/00; G06F 13/36
(52) U.S. Cl. .................. 345/522; 345/520; 710/306; 710/310
(58) Field of Search ................. 345/501–503, 345/520, 522; 710/126, 128, 129, 131, 132, 305, 306, 310, 316, 317

(56) References Cited

U.S. PATENT DOCUMENTS

| | | | | |
|---|---|---|---|---|
| 5,485,559 A | * | 1/1996 | Sakaibara et al. | 395/133 |
| 5,523,769 A | * | 6/1996 | Lauer et al. | 345/1 |
| 5,760,783 A | | 6/1998 | Migdal et al. | 343/430 |
| 5,781,199 A | * | 7/1998 | Oniki et al. | 345/505 |
| 5,784,075 A | | 7/1998 | Krech, Jr. | 345/516 |
| 5,911,056 A | * | 6/1999 | Faget et al. | 710/129 |
| 6,021,451 A | * | 2/2000 | Bell et al. | 710/128 |
| 6,134,622 A | * | 10/2000 | Kapur et al. | 710/128 |
| 6,167,476 A | * | 12/2000 | Olarig et al. | 710/128 |
| 6,233,641 B1 | * | 5/2001 | Graham et al. | 710/131 |

OTHER PUBLICATIONS

Bursky, Dave, "Acceleration Puts the "Snap" Into Graphics," *Dedicated Graphics Support Chips Accelerate Operations To Improve Drawing Speeds*, Jul. 25, 1994, vol. 42, No. 15, pp. 55–56, 58, 60, 64, 66, 70, 72, 74.

"Accelerated Graphics Port AGP," Printed Feb. 24, 1999 from *http://developer.intel.com/technology/agp*, 4 pages.

"Accelerated Graphics Port AGP benefits," Printed Feb. 24, 1999 from *http://developer.intel.com/technology/agp/benefits/index.htm*, 2 pages.

"Accelerated Graphics Port demo," Printed Feb. 24, 1999 from *http://developer.intel.com/technology/agp/demo/index.htm*, 2 pages.

(List continued on next page.)

*Primary Examiner*—Ulka J. Chauhan
(74) *Attorney, Agent, or Firm*—Woodcock Washburn LLP

(57) ABSTRACT

An apparatus and method is provided that increases the throughput of graphics commands transferred between a system bridge and a graphics subsystem. In one embodiment, the apparatus tags each of the multiple graphics commands to indicate a specific order of the multiple graphics commands. Each of the tagged multiple graphics commands are then assigned to one of a plurality of busses. The plurality of busses transfer each of the multiple graphics commands across its assigned one the plurality of busses. After being transferred across the plurality of busses, the multiple graphics commands are put back in their original specific order through the use of the tags. The reordered (also referred to as regrouped) multiple graphics commands are then transferred to the graphics subsystem. In another embodiment, multiple graphics commands are transferred over a plurality of busses to functional components of the graphics subsystem.

42 Claims, 8 Drawing Sheets

OTHER PUBLICATIONS

"Accelerated Graphics Port tutorial," Printed Feb. 24, 1999 from *http://developer.intel.com/technology/agp/tutorial/index.htm* and other links, 12 pages.

"AGP and 3D Graphics Software," Printed Feb. 24, 1999 from *http://developer.intel.com/drg/mmx/AppNotes/agp.htm*, 11 pages.

*A.G.P. Pro Specification*, Revision 0.9, Intel Corporation, Jul. 1998, 34 pages.

"The Future of Business Computing: The Visual Connected PC," Printed Feb. 24, 1999 from *http://www.intel.com/intel/june297/whitepap.htm*, 18 pages.

"Intel Platforms For Visual Computing," Mar. 24, 1997, Printed Feb. 24, 1999 from *http://www.intel.com/intel/march24/techinfo.htm*, 8 pages.

"The Intel740™ Graphics Accelerator," Printed Feb. 24, 1999 from *http://www.intel.com/design/graphics/740/agp.htm* and link, 3 pages.

"Intergraph s Concurrent Multiport Architecture: *Achieving New Levels of I/0 and Memory Subsystem Bandwidth*," Intergraph Computer Systems, 5 pages.

Montrym, J.S. et al., "InfiniteReality: A Real–Time Graphics System," *Computer Graphics Proceedings Annual Conference Series*, 1997, pp. 293–302.

"PC 3D Graphics Glossary of Terms," Printed Feb. 24, 1999 from *http://developer.intel.com/drg/mmx/AppNotes/3DGLOSS.HTM*, 6 pages.

* cited by examiner

REGROUPING EMBODIMENT

NON-REGROUPING EMBODIMENT

APPARATUS AND METHOD FOR INCREASING THE BANDWIDTH TO A GRAPHICS SUBSYSTEM

BACKGROUND OF THE INVENTION

1. Field of the Invention

The present invention pertains to the field of computer graphics. More particularly, the present invention relates to an apparatus and method for increasing the bandwidth to a graphics subsystem.

2. Related Art

FIG. 1A illustrates a block diagram of an example computer system 100A in which the present invention can be used. Computer system 100A includes a graphics subsystem 102, a central processing unit (CPU) 104, a system memory 108 (also known as main memory) and a system bridge 106. A processor bus (also known as a host bus or a front bus) 110 couples CPU 104 and system bridge 106. A memory bus 112 couples system memory 108 and system bridge 106. Additionally, peripheral bus 114 couples various input and/or output (I/O) devices 120, also referred to as peripheral devices, to system bridge 106.

Examples of peripheral devices that are used to input commands and information include keyboards and cursor control devices (e.g., a mouse, trackball, joystick, etc.). Examples of peripheral devices that are used to output information include a printer and a display screen. Additional examples of peripheral devices include floppy disk drives, hard disk drives, optical disk drives, and the like. In addition to coupling other I/O devices 120 to system bridge 106, FIG. 1A also shows peripheral bus 114 coupling graphics subsystem 102 to system bridge 106.

In a simple form, each bus (i.e., system bus 110, memory bus 112, and peripheral bus 114) is essentially a collection of wires and connectors for transferring data between subsystems (i.e., CPU 104, system memory 108, I/O devices 120, and graphics subsystem 102) of computer system 100A. Alternatively, each bus may be specifically designed for the type of device its supporting. For example, peripheral bus 114 can be a Peripheral Component Interconnect (PCI) bus which is a self-configuring personal computer local bus designed by Intel Corporation, Santa Clara, California, specifically for peripheral devices. A PCI bus typically provides a bandwidth of 133 Mbytes/sec when running at 33 MHz. When peripheral bus 114 is a PCI bus, I/O devices 120 are sometimes referred to as PCI-based devices.

Graphics subsystem 102 (also known as a graphics controller, graphics accelerator, graphics chip, graphics hardware, graphics board, or graphics card) is the hardware of computer system 100A that is dedicated to enabling computer system 100A to display images, such as three dimensional (3D) objects on a display (not shown). Graphics subsystem 102 typically includes its own local processor for computing graphical transformations, and the like. Additionally, graphics subsystem 102 typically has its own local graphics memory, such as texture memory and a frame buffer, which are reserved for storing data associated with graphical representations. The local graphic memory can be conventional DRAM, or other special types of memory such as video RAM (VRAM), which enables both video circuitry and the local processor to simultaneously access the local graphics memory. Such dedicated local graphics memory is typically more expensive than system memory 108 and cannot be used by computer system 100A for other purposes (that is, non graphics purposes) when it is not being fully utilized by graphics subsystem 102.

As computer graphics become more realistic and complex, increased burdens are places on computer system 100A. For example, the generation of full motion animated 3D graphics requires the performance of continual intensive geometry calculations that define an object in 3D space. These geometry calculations can be performed by CPU 104, which is well-suited for performing these calculations because it can handle the floating point type operations that are often required. Alternatively, these calculations can by performed by the local processor of graphics subsystem 102.

Graphics subsystem 102 processes various types of graphics data. For example, graphics subsystem 102 processes texture data in order to create lifelike surfaces and shadows within a 3D image. Often one of the most critical aspect of 3D graphics is the processing of texture maps, the bitmaps which are used to represent in detail the surfaces of 3D objects. Texture map processing consists of fetching one, two, four, eight, or more texels (texture elements) from a bitmap, averaging them together based on some mathematical approximation of the location in the bitmap (or multiple bitmaps) needed on the final image, and then writing the resulting pixel to the local graphics memory of graphics subsystem 102. The texel coordinates are functions of the 3D viewpoint and the geometry of the object onto which the bitmap is being projected and the location of the bitmap on the object. Other types of graphics data that are processed by graphics subsystem 102 include geometry data, also referred to as polygon descriptions (e.g., triangles consisting of three vertices), normals, color indices, and the like.

Typically, graphics data, such as texture maps, are read from an I/O device 120 (such as a hard drive) and loaded into system memory 108. For example, texture map data travels through peripheral bus 114, system bridge 116, and memory bus 112 before being loaded into system memory 108. The texture map can then be read into CPU 104, from system memory 108, when it is to be used. CPU 104 performs any necessary transformation and then caches the results. The cached data is either written back to system memory 108 or sent (pushed) from CPU 104 to graphics subsystem 102. If the transformed textures are written back to system memory 108, graphics subsystem 102 can read (pull) the transformed textures from system memory 108. Upon receiving the transformed textures and/or any other types of graphics data, graphics subsystem 102 can immediately use them or write them in its local graphics memory.

Thus, for computer system 100A shown in FIG. 1A, graphics data that is destined for or generated by graphics subsystem 102 must always travel over peripheral bus 114. Therefore, the bandwidth of peripheral bus 114 (i.e., 133 MBytes/sec, if peripheral bus 114 is a typical current PCI bus) limits the rate at which texture maps, and other graphics data, can be transferred to and from graphics subsystem 102. Additionally, since graphics subsystem 102 shares peripheral bus 114 with several other I/O devices 120, congestion often occurs on peripheral bus 114. Accordingly, peripheral bus 114 is often a bottleneck in computer system 100A of FIG. 1A.

Solutions for overcoming the above deficiencies have been proposed. For example, FIG. 1B illustrates the use of a dedicated graphics bus 116 which avoids the problems associated with graphics subsystem 102 sharing bus resources with various other I/O devices 120. As shown in FIG. 1B, graphics bus 116 couples graphics subsystem 102 and system bridge 106. An example of such a dedicated graphics bus 116 is an Accelerated Graphic Port (AGP) compatible bus. AGP, which is an interface specification developed by Intel Corporation, Santa Clara, Calif., is based on PCI, but is designed especially for the throughput demands of 3D graphics. Rather than using the PCI bus for graphics data, AGP introduces a dedicated point-to-point channel so that graphics subsystem 102 can directly access system memory 108. An AGP channel is 32 bits wide and runs at 66 MHZ. This translates into a total bandwidth of 266 MBytes/sec as opposed to a current typical PCI bandwidth of 133 MBytes/sec. AGP also supports two optional faster modes with throughput of 533 MBytes/sec and 1.07 GBytes/sec. In the arrangement of FIG. 1B, if graphics bus 116 is an AGP bus, then system bridge 106 can be Intel's 440BX chipset.

Another example of a bus 116 that can be used to transmit graphics data is a serial bus, such as a FIREWIRE (also know as IEEE 1394) compliant bus. FIREWIRE is a serial bus interface standard offering high-speed communications and isochronous real-time data services. More specifically, FIREWIRE, which is a trademark of Apple Computer, Inc., Cupertino, Calif., is a bus standard that supports data transfer rates of 100, 200, or 400 MBytes/sec. Other companies use other names, such as I-link and Lynx, to describe their IEEE 1394 compliant products.

System bridge 106 performs system interconnect functions. That is, one of the main purposes of system bridge 106 is to facilitate data transfers throughout computer systems 100A, 100B. For example, system bridge 106 enables CPU 104 to system memory 108 access to occur independently of CPU 104 to I/O device 120 (e.g., hard drive) access. Additionally, for example, system bridge 106 enables CPU 104 to read data from an I/O device 120 while simultaneously sending data to graphics subsystem 102. Thus, system bridge 106 can be a component dedicated to system interconnect functions, such as a crossbar switch. In one embodiment, system bridge 106 also controls access to system memory 108, and thus performs the functions of a memory controller. Alternatively, memory control functions can be performed by a separate subsystem, such as a dedicated memory controller (not shown), or can reside within system memory 108.

Typically, virtual to physical memory translation functions are performed by CPU 104. However, in the embodiment where system bridge 106 provides the functions of a memory controller, system bridge 106 can also support virtual memory and paging by translating virtual addresses into physical addresses. For example, system bridge 106 can include a page table which is indexed by a page number. Each page table entry (PTE) gives the physical page number corresponding to the virtual one. This is combined with a page offset to give the complete physical address. A PTE may also include information about whether the page has been written to, when it was last used, what kind of processes (user mode, supervisor mode) may read and write it, and whether it should be cached.

In one embodiment, system bridge 106 can assist in maintaining cache-coherency, which means that data in a cache is updated and moved appropriately as it is accessed by a subsystem (such as CPU 104) of the whole computer system 100A, 100B. For example, when an I/O device 120 writes data into system memory 108, that data is also stored in a cache. If a CPU 104 attempts to read from that same memory location, CPU 104 will actually be provided with a copy of the data stored in the cache. In addition to speeding access to the data, this scheme also serves to prevent multiple memory accesses for the same piece of data, which frees up memory bus 112 for other accesses. Further, system bridge 106 may support multiplexing of system memory 108. Of course, system bridge 106 does not need to support of all these features to work with the present invention.

Examples of components that can perform the interconnect functions of system bridge 106, without performing memory control functions, are the Crossbow ASIC which is part of the Crossbar System Interconnect designed by Silicon Graphics, Inc. (SGI), Mountain View, Calif., and the Ultra Port Architecture (UPA) interconnect designed by Sun Microsystems, Palo Alto, Calif. Examples of system bridges 106 that can perform both system interconnect and memory control functions are Intel's 440 BX AGP chipset and the Cobalt graphics chipset designed by SGI. Each of these exemplary system bridges 106 support some features that are not supported by the other examples. An important feature of system bridge 106, with respect to the present invention, is that it interconnects the various subsystems/devices of computer systems 100A, 110B, and allows the various subsystems/devices to access one another. For example, in a preferred embodiment, system bridge 106 enables CPU 104 to access data from system memory 108 while an I/O device 120 (e.g., a hard drive) simultaneously sends data to system memory 108. Additionally, a system bridge 106, such as SGI's Cobalt graphics chipset, may even perform some graphics operations that are typically performed by graphics subsystem 102 or CPU 104.

Graphics busses transport graphics data. Graphics data includes graphics commands that pertain to texture, geometry, normals, colors, and the like. A graphics command can be a graphics application program interface (API) command, or other read or write type commands. At a lower level, a graphics command can be any type of machine code command that graphics subsystem 102 understands (for example, a read or write command). An example 3D graphics language is OPENGL which was developed by SGI. Another example of an API designed for manipulating and displaying 3D objects is Direct3D, which was developed by Microsoft Corp., Redmond, Wash. Of course graphics data can also be more simple two dimensional (2D) graphics commands.

Regardless of whether graphics data (e.g., texture maps, transformed textures, geometry data, or graphics commands) is read from system memory 108 or transferred directly from CPU 104, the graphics data must travel over graphics bus 116. Accordingly, graphics bus 116 may be a bottleneck when large amounts of graphics data are being transferred to graphics subsystem 102. This is especially true when graphics data is being simultaneously transferred from both CPU 102 and system memory 108 to graphics subsystem 102. Accordingly, the bandwidth to graphics subsystem 102 must be increased in order to take advantage of increasingly powerful advanced graphics hardware.

The typical methods used for increasing bandwidth are to increase the width and/or the speed of a bus. With respect to increasing speed, there are electrical limits on the speed that a bus can handle. With respect to width, hardware complexity and cost typically increase as the width of a bus increases. For example, as the width of a bus increases the number of required physical connections between the bus and a subsystem also increases. Such an increase in physical connections may not be compatible with existing hardware (such as connectors) of subsystems (such as system bridge 106). One recent example of a graphics bus having an relatively high bandwidth is Intel's AGP, which is discussed above. However, although an AGP bus provides a relatively high bandwidth, the AGP bus can still become a bottleneck where a graphics subsystem can handle more data than the AGP bus can deliver.

Accordingly, there is a need to increase the bandwidth to graphics subsystem 102. This will allow a greater throughput of graphics data. In addition, increases in the bandwidth to graphics subsystem 102 may enable existing system resources, such as system memory 108, to be utilized in preference to dedicated local memory within graphics subsystem 102. This is beneficial because system memory 108 is usually much less expensive than local graphics memory. Additionally, unlike local graphics memory, system memory 108 can be used by other subsystems of computer system 100A, 100B, for other purposes (that is, non graphics purposes), when it is not needed by graphics subsystem 102.

SUMMARY OF THE INVENTION

The present invention, which is directed toward an apparatus and method for increasing the bandwidth to a graphics subsystem, can be used in a computer system that includes a central processing system and a system memory, each of which is coupled to a system bridge. More specifically, the apparatus and method of the present invention can be used to increase the throughput of graphics commands that can be transferred between the system bridge and a graphics subsystem.

In one embodiment, the apparatus of the present invention includes a graphics bus scheduler, a plurality of busses, a graphics bus de-scheduler, and buffers. A first buffer temporarily stores multiple graphics commands which are transferred from the system bridge to the first buffer in a specific order. The graphics bus scheduler tags each of the multiple graphics commands with tags that indicate the specific order of the multiple graphics commands, assigns each of the multiple graphics commands to one of a plurality of busses, and transfers each of the multiple graphics commands from the first buffer to its assigned one of the plurality of busses.

In one example, the graphics bus scheduler assigns each of the multiple graphics commands to the plurality of busses according to a type of command (e.g., geometry, texture). In another example, the graphics bus scheduler assigns the multiple graphics commands to the plurality of busses in such a manner as to create a pipeline effect across the plurality of busses.

The plurality of busses transfer the multiple graphics commands between the graphics bus scheduler and a graphics bus de-scheduler. When the graphics bus de-scheduler accepts the multiple graphics commands transferred across the plurality of busses, the accepted multiple graphics commands do not necessarily have the specific order that the commands had within the first buffer. Accordingly, once it has accepted the multiple graphics commands, the graphics bus de-scheduler transfers the accepted multiple graphics commands into a second buffer according to the tags, such that the multiple graphics commands regain the specific (i.e., original) order within the second buffer. The reordered (also referred to as regrouped) multiple graphics commands are then be transferred from the second buffer to the graphics subsystem.

In an alternative non-regrouping embodiment, the apparatus of the present invention transfers graphics commands from the system bridge directly to specific functional components of the graphics subsystem. In this embodiment the graphics bus scheduler can assign each of the multiple graphics commands to one of the plurality of busses according to a type of command. Further, in this embodiment the multiple graphics commands are not tagged and are not regrouped. Accordingly, in this embodiment the graphics bus de-scheduler and buffers can be omitted.

By substantially increasing the bandwidth between system bridge 106 and graphics subsystem 102, the amount of local graphics memory (such as local texture memory 718 and/or frame buffer 714) of graphics subsystem 102 can be radically reduced when using the present invention.

Further features and advantages of the present invention, as well as the structure and operation of various embodiments of the present invention, are described in detail below with reference to the accompanying drawings.

BRIEF DESCRIPTION OF THE FIGURES

The accompanying drawings, which are incorporated herein and form part of the specification, illustrate the present invention and, together with the description, further serve to explain the principles of the invention and to enable a person skilled in the pertinent art to make and use the invention.

In the drawings, like reference numbers indicate identical or functionally similar elements. Additionally, the left-most digit(s) of a reference number identifies the drawing in which the reference number first appears.

DETAILED DESCRIPTION OF THE PREFERRED EMBODIMENTS

The present invention pertains to an apparatus and method for increasing the bandwidth to (and from) a graphics subsystem of a computer system.

1. Regrouping Embodiment

Figure 1A:
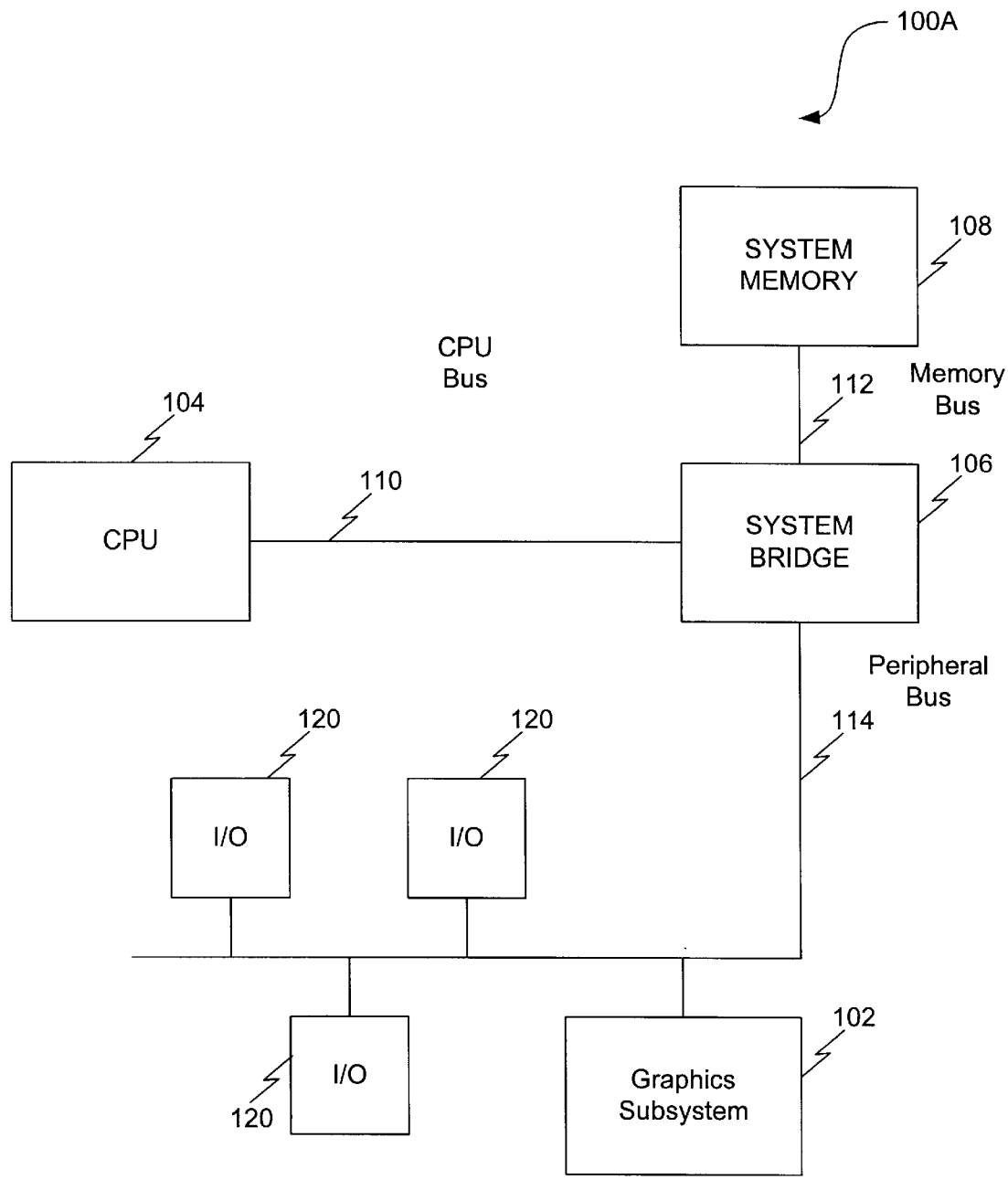
FIGS. 1A and 1B are block diagrams of computer systems in which the present invention may be useful.
Figure 1B:
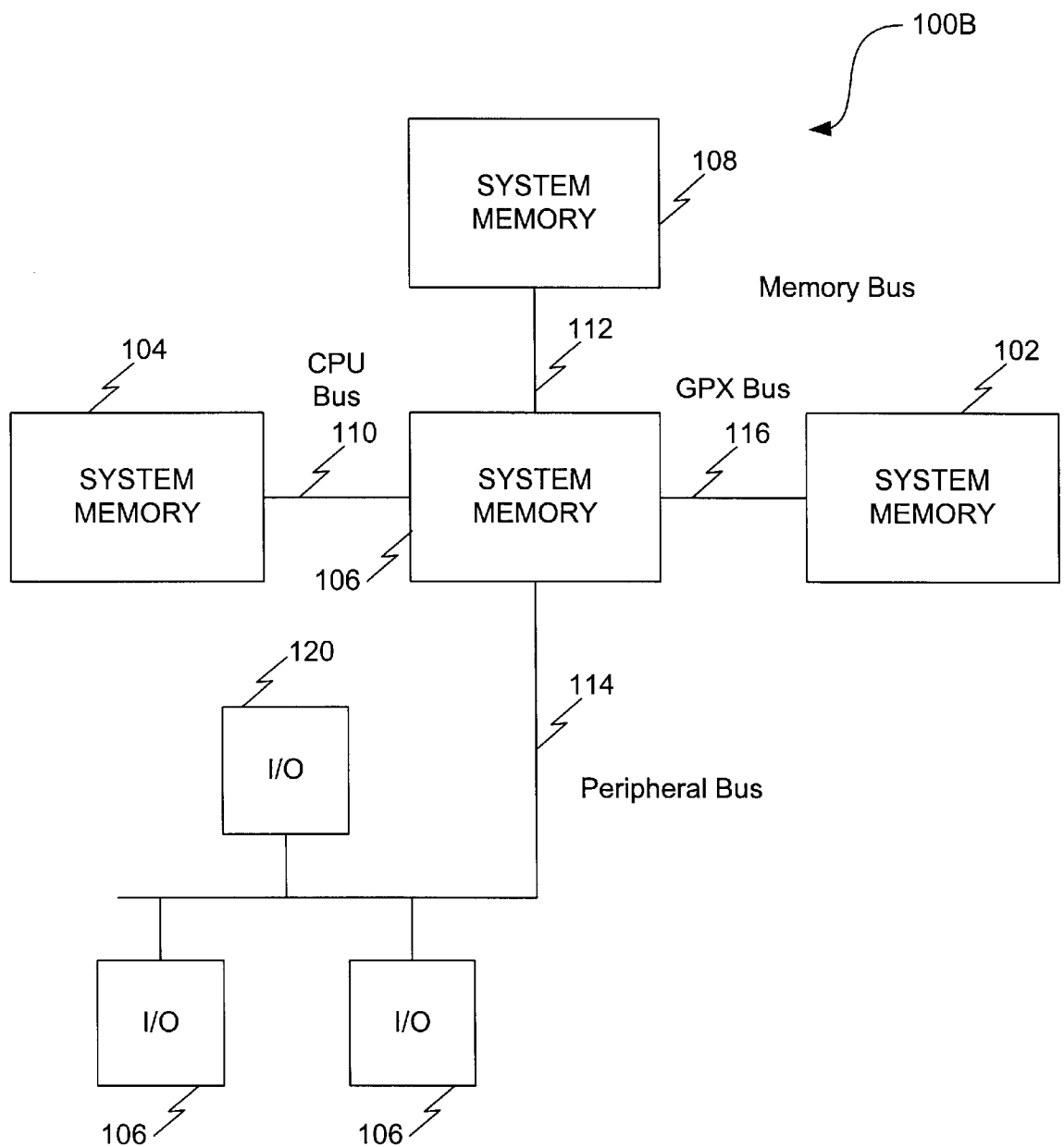
Figure 2:
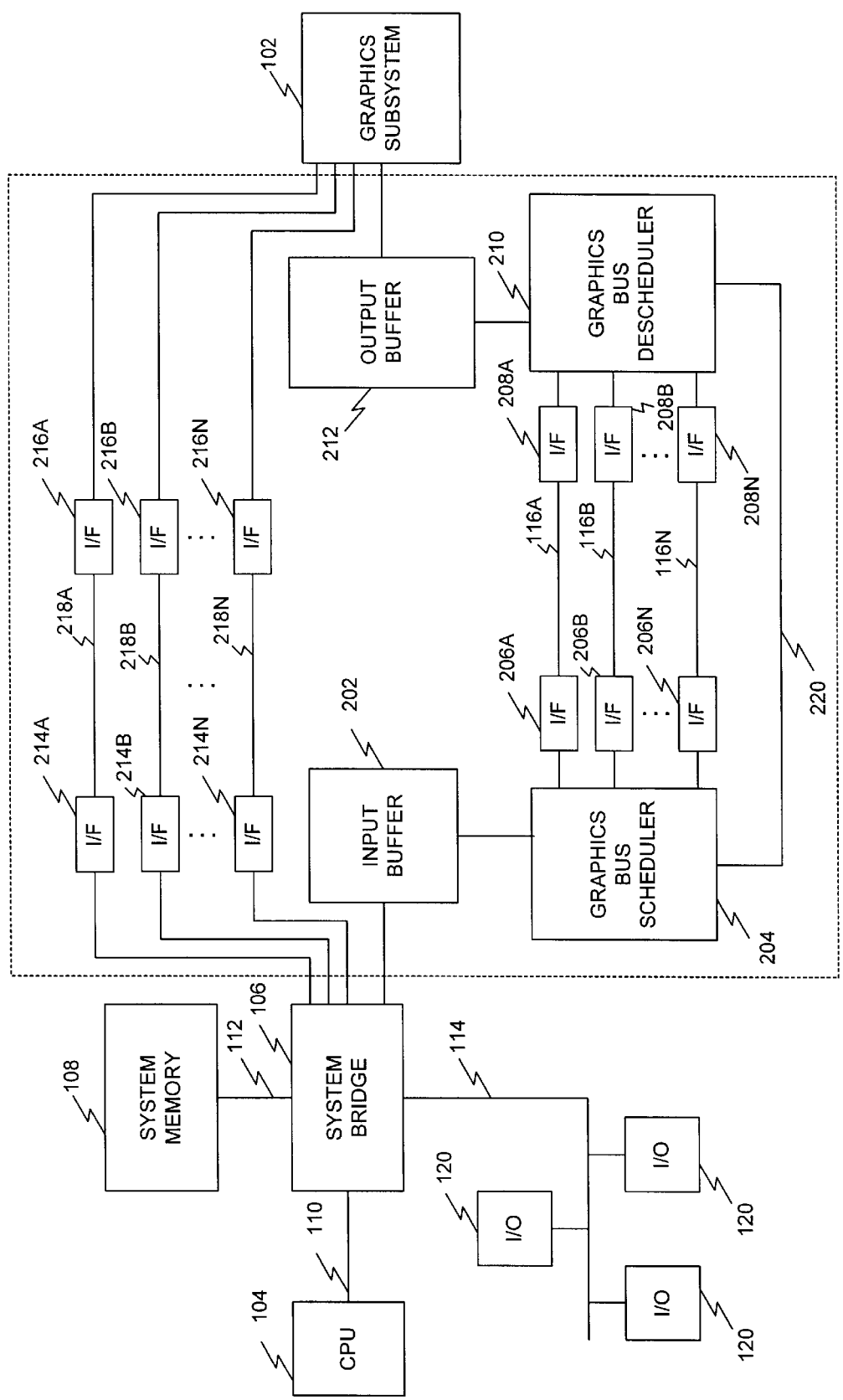
FIG. 2 is a block diagram illustrating an embodiment of the present invention.

FIG. 2 illustrates one embodiment of the present invention. In this embodiment, the apparatus of the present invention includes an input buffer 202, a graphics bus scheduler (GBS) 204, two or more graphics busses 116A–116N, a graphics bus de-scheduler (GBD) 210, and an output buffer 212.

A transfer of graphics commands may be initiated by graphics subsystem 102 requesting graphics commands. For example, graphics subsystem 102 may read graphics commands from system memory 108 (this is often referred to as a "pull" model). Alternatively, the transfer of graphics commands can be initiated by a subsystem other than graphics subsystem 102. For example, CPU 104 can send (write) graphics commands to graphics subsystem 102 (this is often referred to as a "push" model). Regardless of which subsystem initiates the transfer, graphics commands travel through system bridge 106 en route to graphics subsystem 102. Further, as will be discussed in more detail below, graphics commands may travel in the reverse direction, from graphics subsystem 102 toward system bridge 106.

Input buffer 202, which is coupled to system bridge 106, temporarily stores graphics commands that are to be transferred from system bridge 106 to graphics subsystem 102. Input buffer 202 stores the graphics commands such that their original order (i.e., the order in which the graphics commands were transferred from system bridge 106 to input buffer 202) is known.

GBS 204 tags the multiple graphics commands (for example, graphics API commands) that are stored within input buffer 202 to thereby indicate the specific order of the commands. GBS 204 also assigns each of the multiple graphics commands to one of the plurality of busses 116A–116N, which transfer the multiple graphics commands between GBS 204 and GBD 210.

GBS 204 can assign the graphics commands to the plurality of busses 116A–116N in a number of ways. For example, GBS 204 can assign/sort the graphics commands according to the type of command. That is, GBS 204 may assign geometry related commands (i.e., vertices) to a first bus 116A while assigning texture related command (i.e, texture maps) to a second bus 116B. Alternatively, GBS 204 can assign a first graphics command to a first bus 116A, a second graphics command to a second bus 116B, and an Nth graphics command to a Nth bus 116N to create a pipeline type effect across the plurality of busses 116A–116N. Other bus assignment schemes can be used by GBS 204. For example, graphics commands can be scheduled based on the availability of a bus, to balance bus load, to evenly distribute commands, or to unevenly distribute traffic over the busses 116A–116N.

Table 1 below illustrates one example of how GBS 204 can tag and assign multiple graphics commands to a plurality (in this example, three) busses 116A–116N (referred to as, bus1, bus2 and bus3) to create a pipeline type effect across the plurality of busses 116A–116N. The first column indicates the tag associated with a graphics command, the second column indicates the bus that GBS 204 assigns the graphics command to, and the third column includes exemplary Open GL pseudo-code graphics commands. These graphics commands are selected from a test program that draws a random series of connected triangle strips.

TABLE 1

| TAG | BUS | Pseudo-Code of Graphics Command |
| --- | --- | --- |
| 1 | bus1 | glFinish( ) ; |
| 2 | bus2 | glRenderMode( GL_RENDER) ; |
| 3 | bus3 | glViewport(0, 0, 0x258, 0x258) ; |
| 4 | bus1 | glMatrixMode ( GL_PROJECTION) ; |
| 5 | bus2 | glLoadIdentiy( ) ; |
| 6 | bus3 | glMatrixMode (GL_MEDELVIEW) ; |
| 7 | bus1 | glRotatef(55, 1, 1.25, 1.5) ; |
| 8 | bus2 | glTranslagef(1, 2, 3) ; |
| 9 | bus3 | glLightfv (GL_LIGHT0, GL_DIFFUSE, 0x7fff2ab0) ; |
| 10 | bus1 | glLightfv (GL_LIGHT0, GL_SPECULAR, 0x7fff2ab0) ; |
| 11 | bus2 | glLightfv (GL_LIGHT0, GL_POSITION, 0x7fff2ab0) ; |
| 12 | bus3 | glEnable (GL_LIGHTING) ; |
| 13 | bus1 | glMaterialf( GL_FRONT_AND_BACK, GL_SHININESS, 10) ; |
| 14 | bus2 | glMaterialfv ( GL_FRONT_AND_BACK, GL_SPECULAR, 0x7fff2ad0) ; |
| 15 | bus3 | glLightMedeli ( GL_LIGHT_MEDEL-LOCAL_VIEWER, 0) ; |
| 16 | bus1 | glEnable ( GL_LIGHT0 ) ; |
| 17 | bus2 | glShadeModel ( GL_SMOOTH) ; |
| . | . | . |
| . | . | . |
| . | . | . |
| 25 | bus1 | glBegin (GL_TRIANGLE_STRIP) ; |
| 26 | bus2 | glNormal3fv ( –36.3785, –36.3785, –0.695387 ) ; |

TABLE 1-continued

| TAG | BUS | Pseudo-Code of Graphics Command |
| --- | --- | --- |
| 27 | bus3 | glVertex3fv ( –3.43724, –3.99015, –5.89054 ) ; |
| 28 | bus1 | glNormal3fv ( –36.377, –36,9375, –0.695359 ) ; |
| 29 | bus2 | glVertex3fv ( –3.45947, –4.0145, –5.87967 ) ; |
| 30 | bus3 | glNormal3fv ( –35.8189, –36.604, –0.84835 ) ; |
| 31 | bus1 | glVertex3fv ( –3.41042, –4.00736, –5.85063 ) ; |
| 32 | bus2 | glNormal 3fv ( –35.2637, –36.8322, –0.674367 ) ; |
| 33 | bus3 | glVertix3fv ( –3.38321, –4.02358, –5.81013 ) ; |
| . | . | . |
| . | . | . |
| . | . | . |
| 40 | bus1 | glNormal3fv ( –23.338, –8.8734, –0.449494 ) ; |
| 41 | bus2 | glVertix3fv (–1.45689, –2.77448, –4.9768 ) ; |
| 42 | bus3 | glNormal3fv ( –23.8297, –8.97293, –0.458765 ) ; |
| 43 | bus1 | glEnd ( ) ; |
| . | . | . |
| . | . | . |
| . | . | . |
| 52 | bus1 | glGetError ( ) ; |
| 53 | bus2 | glFlush ( ) ; |
| 54 | bus3 | glFinish ( ) ; |

In this example, GBS 204 responds to the presence of the graphics commands. GBS 204 does not discriminate between the graphics commands based on the type of command or other information. That is, in this example, GBS 204 merely assigns a first command to a first bus, a second command to a second bus, a third command to a third bus, a forth command to the first bus, a fifth command to the second bus, and so on, to create a pipeline effect across three busses. GBS 204 also transfers each of the multiple graphics commands to its assigned one of the plurality of busses 116A–116N. The plurality of busses 116A–116N then transfer the multiple graphics commands from GBS 204 to GBD 210.

GBD 210 accepts the multiple graphics commands that are transferred across the plurality of busses 116A–116N, wherein the accepted multiple graphics commands do not necessarily have the specific order that the graphics commands had within input buffer 202. GBD 210 then transfers the accepted multiple graphics commands into output buffer 212, according to the tags, such that the multiple graphics commands regain the specific order (that is, their original order) within output buffer 212. For example, if GBD 210 receives first, second, and fourth graphics commands (of a sequence of graphics commands), GBD 210 transfers these commands to output buffer 212 such that a gap (placement holder) remains within output buffer 212. GBD 210 can then place the third graphics command in its correct position (in the sequence) once GBD 210 receives the third graphics command. The regrouped multiple graphics commands (in their original specific order) can then be transferred from output buffer 212 to graphics subsystem 102.

Graphic subsystem 102 can access data in at least two ways. More specifically, graphics subsystem 102 can use direct memory access (DMA), which is a technique for transferring data directly from system memory 108 to a graphics subsystem 102 without passing the data through CPU 104 (this corresponds to a "pull" model). Additionally, graphics subsystem 102 can use an 'execute' transfer mode. In this mode: data is read into CPU 104, from system memory 108. CPU 104 performs any necessary transformations on the data and then caches the results; and the cached data is then sent (pushed) from CPU 104 to graphics subsystem 102 (this corresponds to a "push" model). Additionally, the present invention can be used to place several DMA transfers on one bus while using 'execute' transfers simultaneously on a separate bus. This provides for a more efficient transfer of data to graphics subsystem 102.

The above discussion is not meant to limit the present invention to unidirectional operation. Rather, the above discussed operation can be bidirectional. For example, in one embodiment GBD 210 can also perform the functions of GBS 204, and vice versa. In this embodiment, output buffer 212 can also perform the functions of input buffer 202, and vice versa. Accordingly, when having such bidirectional functions, GBS 204 and GBD 210 may be better labeled a first graphics bus scheduler and a second graphics bus scheduler, respectively, or each may be called a graphics bus scheduler/de-scheduler. The only difference between operation in the two directions is whether graphics commands are being transferred from system bridge 106 to graphic subsystem 102, or vice versa.

Each of the plurality of busses 116A–116N can be the same type of bus. Alternatively, busses 116A–116N can be a combination of different types of busses. For example, one bus 116A can be 10baseT Ethernet type bus, while another bus 116B can be a 100baseT Ethernet type bus. Further, one or more of the plurality of busses 116A–116N can be an AGP or FIREWIRE type bus. Additionally, the plurality of busses 116A–116N can include other types of network connections including Integrated Service Digital Network (ISDN) type connections and even satellite links. Accordingly, graphics subsystem 102 can be located at a location that is remote from the other subsystem (i.e., CPU 104, system memory 108, system bridge 106, and peripheral devices 120). For example, if graphics subsystem 102 were remotely located from CPU 104, system memory 108 and system bridge 106, then graphics busses 116A–116N can be multiple ISDN compliant connections which facilitate point-to-point communications between any two locations in the world. The ISDN specification does not specify that multiple simultaneous connections (that is, multiple ISDN connections) between the same two points (e.g., GBS 204 and GBD 210) will utilize the same route. Accordingly, the above discussed regrouping embodiment of the present invention can be used to accommodate for potential time delays that may occur when graphics data is transferred over such multiple ISDN connections. More specifically, the present invention can be used to regroup graphics data, that is transferred over multiple ISDN connections, into their original order.

Graphics subsystem 102 preferably has at least one direct connection 218A to system bridge 106, wherein the direct connection 218A can carry time critical messages, such as interrupts, between graphics subsystem 102 and system bridge 106. In addition to carrying interrupts, direct connection 218A can enable system bridge 106 to feed continuous data, such as streaming video, directly to graphics subsystem 102. Alternatively, interrupts and continuous data, such as streaming video, can be transferred over different direct connections. That is, there may be additional direct connections 218B–218N between graphics subsystem 102 and system bridge 106.

In one embodiment, direct connection 218B can be used when graphics subsystem 102 receives a graphics command instructing it to fetch (pull) data directly from system memory 108 or an I/O device 120 (e.g., a disk drive). In this context, "direct connection" means a connection between system bridge 106 and graphics subsystem 102 which does not require graphics data to travel through input buffer 202 and/or output buffer 212. This is beneficial because delays (caused by buffers 202, 212) should be avoided when transferring certain time critical types of data, such as streaming video. For example, a FIREWIRE type bus, which is discussed above, can provide such a direct connection. It is noted that the graphics command instructing graphics subsystem 102 to fetch data directly from another subsystem (e.g., system memory 108) could have traveled through input buffer 202, GBS 204, one or more of the plurality of busses 116A–116N, GBD 210, and output buffer 212.

GBS 204 and GBD 210 are preferably coupled by a bus 220 that enables GBD 210 to request that GBS 204 retransfer a graphics command(s) that is temporarily stored in input buffer 202. GBD 210 may request the retransfer of a graphics command(s) if GBD 210 determines that it has not accepted a graphics command(s) within a predetermined (i.e., allotted) amount of time (e.g., n microseconds). For example, if GBD 210 has accepted the first, second, and forth graphics commands of a sequence of graphics commands, but has not accepted a third graphics command within a predetermined amount of time, then GBD 210 can use bus 220 to request that GBS 204 retransfer the third graphics command.

In one embodiment, GBS 204 and GBD 210 support encryption and decryption functions to thereby protect confident information that may be transferred across the plurality of busses 116A–116N. For example, GBS 204 can encrypt graphics commands before they are transferred across the plurality of busses 116A–116N. GBD 210 can then decrypt the graphics commands (that it accepts from the plurality of busses 116A–116N) before the graphics commands are transferred to graphics subsystem 102. Any conventional encryption and decryption technique can be used.

Interface devices (I/F) 206A–206N, 208A–208N, 216A–216N, and 218A–218N, are used, if needed, to couple subsystems to busses. For example, an I/F device may couple wire to fiber and perform interface functions that are necessary for a signal to be converted from electrical to optical, and vice versa. These I/F devices may be a separate component, as shown, or may be part of system bridge 106, GBS 204, or GBD 206.

Figure 3:
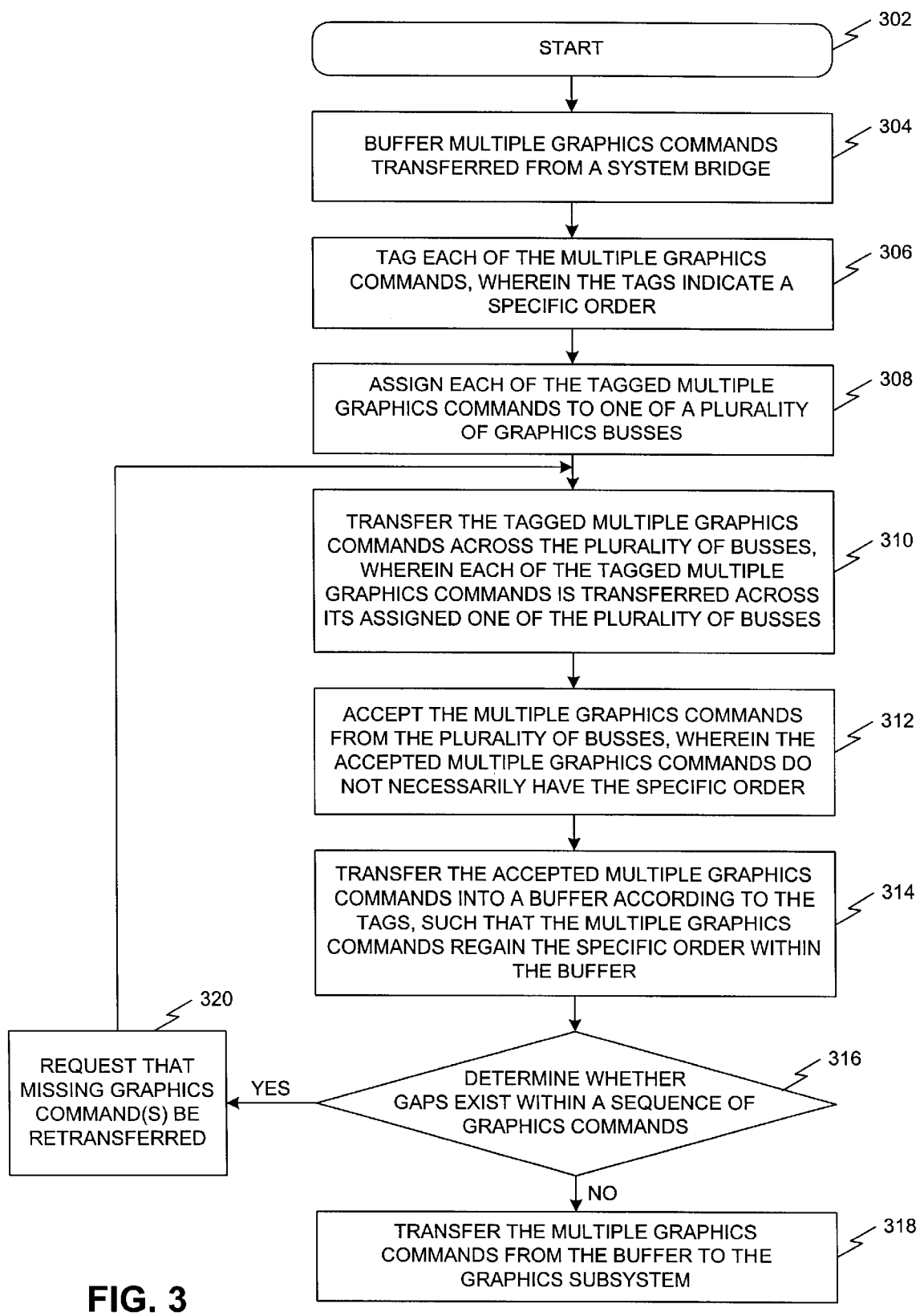
FIG. 3 is a flowchart that shows the operation of the present invention according to the embodiment shown in FIG. 2.

FIG. 3 briefly summarizes how the embodiment of FIG. 2 operates when graphics commands are transferred from system bridge 106 to graphics subsystem 102. Operation begins with step 302, where a transfer of multiple graphics commands is initiated by graphics subsystem 102 or by a system other than graphics subsystem 102, as discussed above.

In step 304, the multiple graphics commands that are transferred from system bridge 106 are temporarily stored by input buffer 202.

In step 306, GBS 204 tags each of the multiple graphics commands such that a specific order of the commands are indicated. In step 308, each of the tagged multiple graphic commands are then assigned to one of the plurality of busses 116A–116N, as described above. The tagged multiple graphics commands are then transferred, by GBS 204, across multiple busses 116A–116N, in step 310.

GBD 210 accepts the multiple graphics commands from the plurality of busses 116A–116N, in step 312. In step 314, GBD 210 transfers the accepted multiple graphics commands into output buffer 212, such that the multiple graphics commands regain their original order.

In a preferred embodiment, GBD 210 determines, after a predetermined amount of time, whether gaps exist within a sequence of the multiple graphics commands, as indicated by step 316. If the answer is "NO", then the multiple graphics commands are transferred from output buffer 212 to graphics subsystem 102, instep 318. If the answer to step 316 is "YES", then GBD 210 requests that GBS 204 retransfer the missing graphics command(s), as indicated by step 320.

2. Non-Regrouping Embodiment

Figure 4:
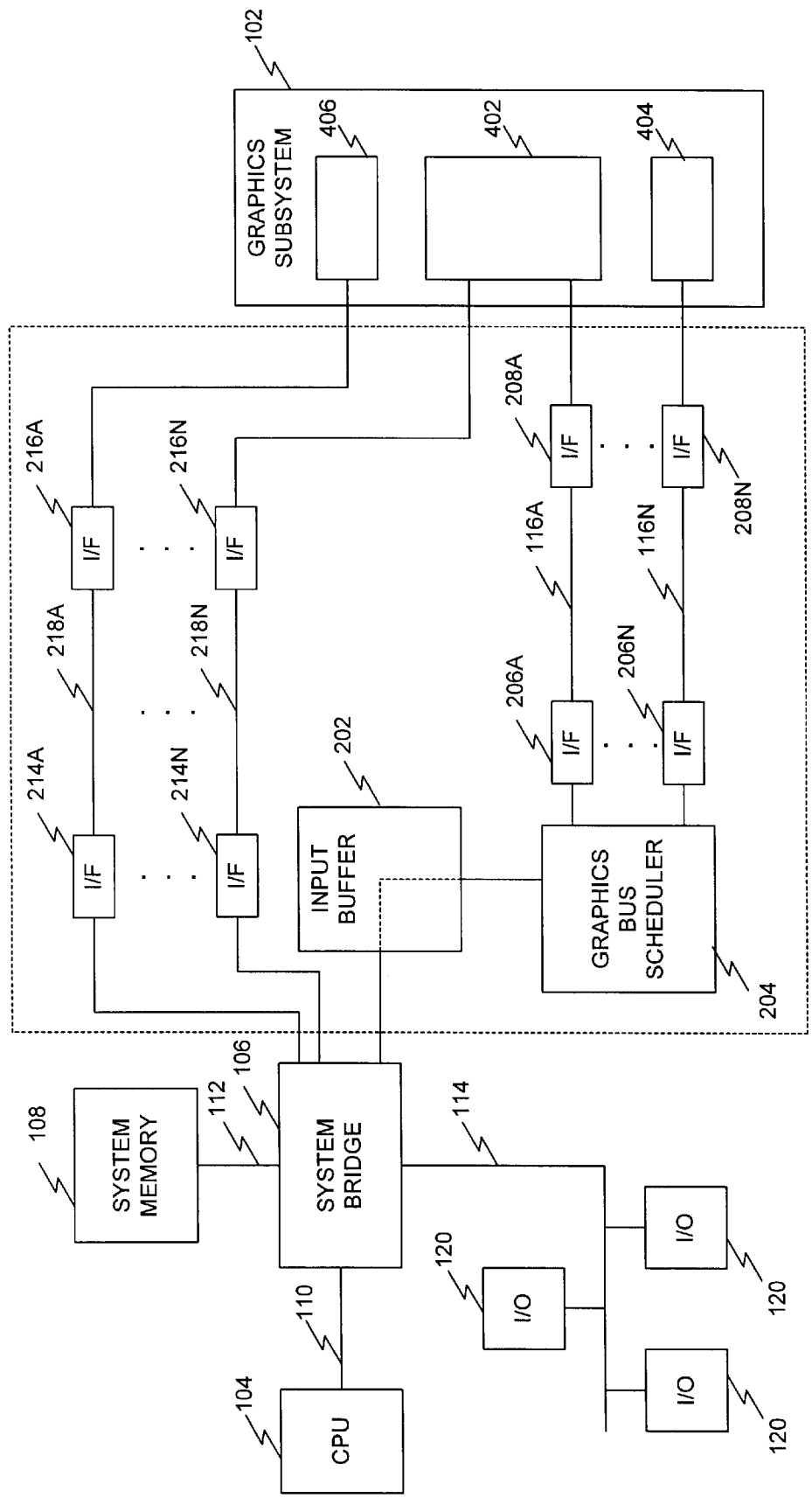
FIG. 4 is a block diagram illustrating an alternative embodiment of the present invention.

FIG. 4 illustrates an alternative embodiment of the present invention in which GBS 204 assigns/sorts graphics commands according to their type, and sends the commands directly to specific functional components of graphics subsystem 102. Thus, in this embodiment there is no need to reorder the graphics commands after they are transferred across the plurality of busses 116A–116N. Further, because the graphics commands are not reordered, there is no need to tag the graphics commands. Tagging, of course, can be performed depending on the user's needs and choices. Accordingly, input buffer 202 is not necessary (but may be used as an interface between system bridge 106 and GBS 204).

The apparatus of this embodiment of the present invention includes GBS 204, two or more graphics busses 116A–116N, and optional input buffer 202. GBS 204 is coupled to system bridge 106 directly, or through input buffer 202. GBS 204 receives multiple graphics commands directly from system bridge 106, or from input buffer 202. As in the above embodiment, GBS 204 assigns each of the multiple graphics commands to one of the plurality of busses 116A–116N. However, in this embodiment GBS 204 does not tag the graphics commands because there is no need to reorder the commands after they are transferred across the plurality of busses 116A–116N.

GBS 202 preferably assigns and/or sorts the graphics commands according to the type of command. For example, geometry type graphics commands (e.g., vertices, normals, colors) are assigned to a first bus and pixel (e.g., texture) type graphics commands are assigned to a second bus. The plurality of busses 116A–116N transfer the multiple graphics commands between GBS 204 and graphics subsystem 102, such that each of the multiple graphics commands is transferred across its assigned bus to a specific functional component of graphics subsystem 102.

Table 2 below illustrates an example of how GBS 204 can assign multiple graphics commands to a plurality (in this example, two) busses 116A–116N (referred to as, bus1 and bus2). The first column indicates the bus that GBS 204 assigns a graphics command to, and the second column includes exemplary OPENGL pseudo-code graphics commands.

In this example, GBS 204 assigns geometry type graphics commands to a first bus 116A and pixel (e.g., texture) type graphics commands to a second bus 116B.

TABLE 2

| BUS | Pseudo-Code of Graphics Command |
|---|---|
| bus1 | glFinish( ) ; |
| bus1 | glRenderMode ( GL__RENDER ) ; |
| bus1 | glViewport (0, 0, 0x258, 0x258) ; |
| . . | |
| . . | |
| . . | |
| bus2 | glTexImage2D ( GL__TEXTURE__2D, 0, 0x3, 0x40, 0x40, 0, GL__RGBA, GL__UNSIGNED__SHORT, 0x107ab000) ; |
| bus2 | glTexImage 2D (GL__TEXTURE__2D, 0x1, 0x3, 0x20, 0x20, 0, GL__RGBA, GL__UNSIGNED__SHORT, 0X107ab000) ; |
| bus2 | glTextImage2D (GL__TEXTURE__2D, 0x2, 0x3, 0x10, 0x10, 0, GL__RGBA, GL__UNSIGNED__SHORT, 0x107ab000) ; |
| bus2 | glTexImage2D (GL__TEXTURE__2D, 0x3, 0x3, 0x8, 0x8, 0, GL__RGBA, GL__UNSIGNED__SHORT, 0x107ab000) ; |
| bus2 | glTexImage2D (GL__TEXTURE__2D, 0x4, 0x3, 0x4, 0x4, 0, GL__RGBA, GL__UNSIGNED__SHORT, 0x107ab000) ; |
| . | |
| . | |
| . | |

TABLE 2-continued

| BUS | Pseudo-Code of Graphics Command |
|---|---|
| bus1 | glMatrixMode ( GL__PROJECTION ) ; |
| bus1 | glLoadIdentity ( ) ; |
| bus1 | glMatrixMode (GL__MODELVIEW) ; |
| bus1 | glLoad Identity ( ) ; |
| bus1 | glRotatef(55, 1, 1.25, 1.5) ; |
| bus1 | glTranslatef(1, 2, 3) ; |
| bus1 | glLightfv (GL__LIGHT0, GL__DIFFUSE, 0x7fff2ab0 ) ; |
| bus1 | glLightfv (GL__LIGHT0, GL__SPECULAR, 0x7fff2ab0 ) ; |
| bus1 | glLight fv (GL__LIGHT0, GL__POSITION, 0x7fff2ab0 ) ; |
| bus1 | glEnable (GL__LIGHTING) ; |
| bus1 | glMaterialf(GL__FRONT__AND__BACK GL__SHININESS, 10); |
| bus1 | glMaterialfv ( GL__FRONT__AND__BACK, GL__SPECULAR, 0x7fff2ad0 ) ; |
| bus1 | glLightModeli ( GL__LIGHT__MODEL__LOCAL__VIEWER, 0) ; |
| bus1 | glEnable ( GL__LIGHT0 ) ; |
| bus1 | glShadeModel (GL__SMOOTH ) ; |
| . | |
| . | |
| . | |
| bus1 | glBegin (GL__TRIANGLE__STRIP); |
| bus1 | glNormal3FV (−36.3785, −36.3785, −0.695387 ) ; |
| bus1 | glTexCoord2fv ( −0.695387, 0.181309 ) ; |
| bus1 | glVertex3fv ( −3.43724, −3.99015, −5.89054 ) ; |
| bus1 | glNormal3fv ( −36.377, −36.9375, −0.695359 ) ; |
| bus1 | glTexCoord2fv ( −0.705928, 0.134688 ) ; |
| bus1 | glVertex3fv( −3.45947, −4.0145, −5.87967 ) ; |
| bus1 | glNormal3fv ( −35.8189, −36.604, −0.684835 ) ; |
| bus1 | glTexCoord2fv ( −0.69964, 0.203727 ) ; |
| bus1 | glVertex3fv ( −03.41042, −4.00736, −5.85063 ) ; |
| bus1 | glNormal3fv ( −35.2637, −36.8322, −0.674367 ) ; |
| bus1 | glTexCoord2fv ( −0.703943, 0.222919 ) ; |
| bus1 | glVertex3fv ( −3.38321, −0.402358, −5.81013 ) ; |
| . . | |
| . . | |
| . . | |
| bus1 | glNormal3fv ( −23.338, −8.8734, −0.449494 ) ; |
| bus1 | glTexCoord2fv ( −0.176747, 0.875623 ) ; |
| bus1 | glVertex3fv ( −1.45689, −2.774448, −4.9768 ) ; |
| bus1 | glNormal3fv ( −23.8297, −8.97293, −0.458765 ) ; |
| bus1 | glTexCoord2fv ( −0.178623, 0.870419 ) ; |
| bus1 | glVertex3fv ( −1.47405, −2.76471, −4.98318 ) ; |
| bus1 | glEnd ( ) ; |
| . . | |
| . . | |
| . . | |
| bus1 | glGetError ( ) ; |
| bus1 | glFlush ( ) ; |
| bus1 | glFinish ( ) ; |

In this example, GBS 204 assigns geometry type graphics commands to a first bus 116A and pixel (e.g., texture) type graphics commands to a second bus 116B.

GBS 204 can distinguish between the different types of graphics commands (e.g., graphics commands pertaining to geometry and graphics commands pertaining to texture) itself. Alternatively, a subsystem other than GBS 204 (such as CPU 104 or system bridge 106) can distinguish between the different types of graphics commands and associate a descriptor with each graphics command. GBS 204 can then distinguish the types of graphics commands based on the graphics command's associated descriptor. That is, GBS 204 can use the descriptor to make decisions.

Such a descriptor, for example, can be a single bit, multiple bits, a byte, or multiple bytes, that is (are) included in, or appended to, a graphics command. Accordingly, GBS 204 can assign a graphics command to a specific bus based on the descriptor associated with that graphics command. For example, if a descriptor consists of a single bit, wherein a '0' indicates that the graphics command pertains to geometry and '1' indicates that the graphics command pertains to texture, then GBS 204 can assign graphics commands having a '0' descriptor bit to a first bus and graphics commands having a '1' descriptor bit to a second bus. The descriptor can include additional bits if more than two type of graphics commands are to be distinguished. For example, if the descriptor included two bits, then up to four different types of graphics commands can be distinguished. It is noted that the use of descriptors is preferably transparent to an application.

After being transferred across the plurality of busses 116A–116N, the multiple graphics commands are provided to specific functional components 402, 404 within graphics subsystem 102. For example, components 402 and 404 can be functional components of graphics subsystem 102 that perform geometry and pixel operations, respectively. More specifically, graphics commands can be directly transferred to the appropriate component/stage of a graphics pipeline 700, which is discussed below.

Graphics subsystem 102 preferably has at least one direct connection 218A–218N to system bridge 106. Direct connection 218A can enable system bridge 106 to feed continuous data, such as streaming video, directly to specific components of graphics subsystem 102, such as a frame buffer, represented by component 406.

Figure 5:
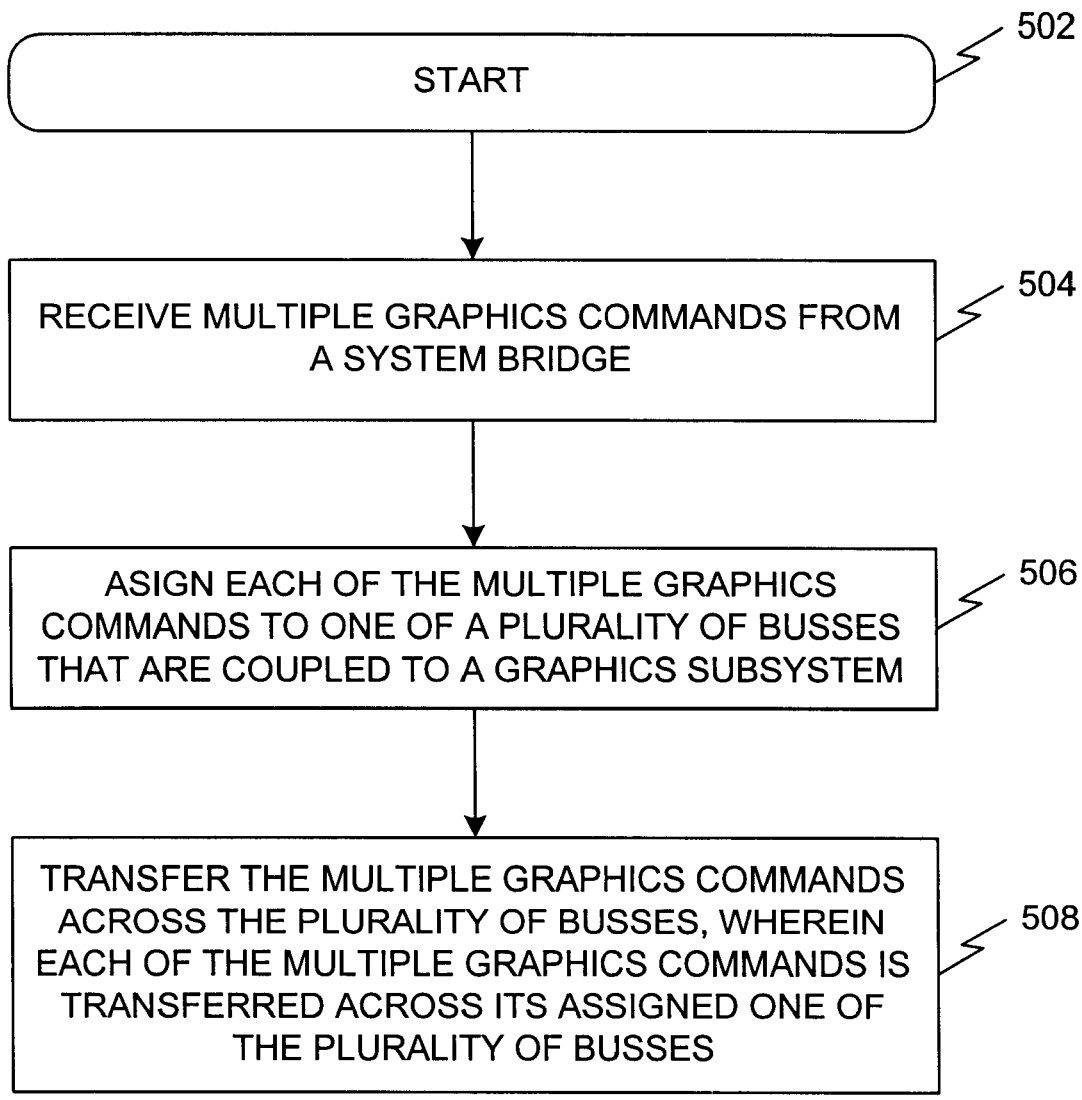
FIG. 5 is a flowchart that shows the operation of the present invention according to the embodiment shown in FIG. 4.

FIG. 5 briefly summarizes how the embodiment of FIG. 4 operates when graphics commands are transferred from system bridge 106 to graphics subsystem 102. Operation begins with step 502, where a transfer of multiple graphics commands is initiated by graphics subsystem 102 or by a system other than graphics subsystem 102, as discussed above.

In step 504, GBS 204 receives the multiple graphics commands from system bridge 106.

In step 506, GBS 204 assigns each of the multiple graphics commands to one of the plurality of busses 116A–116N that are coupled to graphics subsystem 102.

The multiple graphics commands are then transferred across the plurality of busses 116A–116N, in step 508, wherein each of the multiple graphics commands is transferred across its assigned one of the plurality of busses 116A–116N. As discussed above, each of the plurality of busses transfers the multiple graphics commands (that are assigned to that bus) directly to a specific functional component of graphics subsystem 102.

3. Combination Regrouping and Non-Regrouping Embodiment

Figure 6:
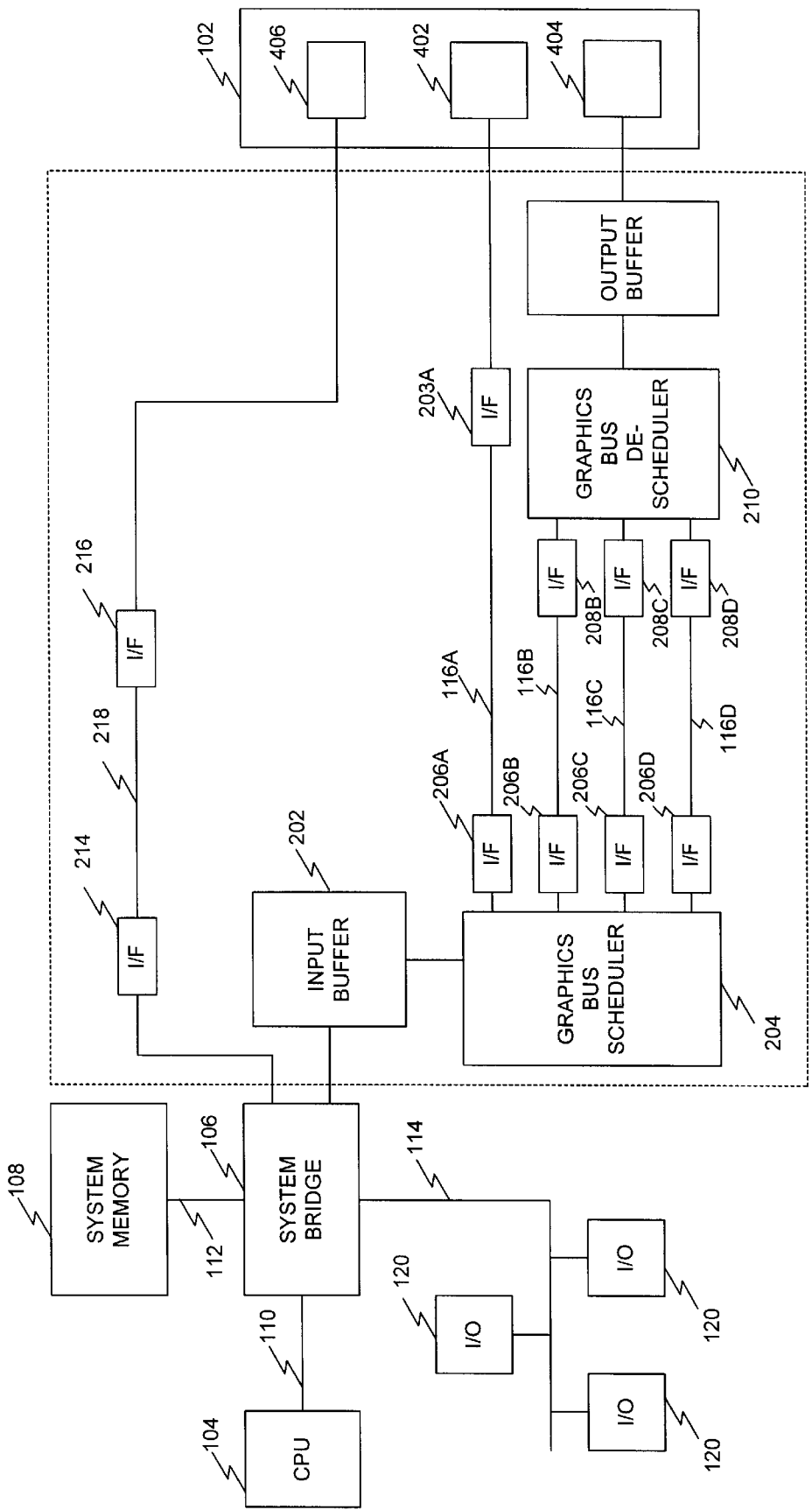
FIG. 6 is a block diagram of an embodiment of the present invention that combines the embodiments of FIG. 2 and FIG. 4.

FIG. 6 illustrates an embodiment that combines the above discussed regrouping and non-regrouping embodiments. GBS 204 assigns each of the multiple graphics commands to one of the plurality of busses 116A–116D according to their type and transfers certain types of commands across bus 116A directly to a specific functional component of graphics subsystem 102. GBS 204 transfers other types of commands across graphics busses 116B–116D to GBD 210 so that the commands can be reordered after being transferred. The graphics commands that are to be transferred across busses 116B–116D are tagged, to thereby indicate the specific order of the commands.

For example, GBS 204 transfers pixel (e.g., texture) related graphics commands across bus 116A directly to an appropriate functional component of graphics subsystem 102, and transfers geometry related graphics commands across busses 116B–116D to GBD 210. The geometry related graphics commands accepted by GBD 210 do not necessarily have the specific order that the commands had within input buffer 202. GBD 210 transfers the accepted multiple graphics commands into output buffer 212, according to the tags, such that the multiple graphics commands regain the specific order (that is, their original order) within output buffer 212. The multiple graphics commands (in their original specific order) are then be transferred from output buffer 212 to the functional component of graphics subsystem 102 that performs geometry operations.

4. Graphics Subsystem

Figure 7:
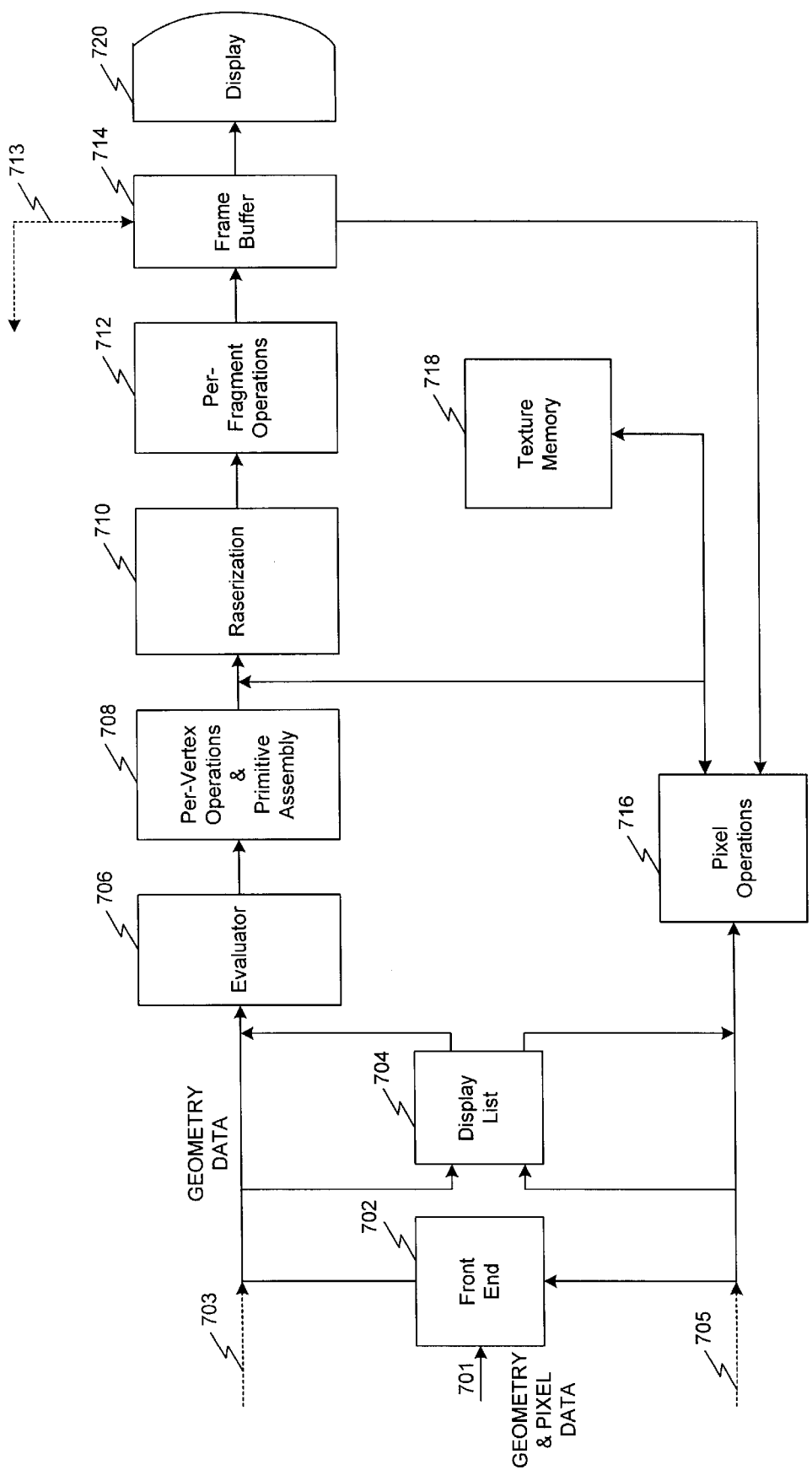
FIG. 7 is a block diagram of an example graphics processing pipeline of a graphics subsystem.

FIG. 7 is a block diagram of an example graphics processing pipeline environment 700 of graphics subsystem 102. Graphics processing environment 700 can include but is not limited to an OPENGL operation as described in Neider et al., *OPENGL Programming Guide, The Official Guide to Learning OPENGL*, Release 1, Silicon Graphics Inc. (Addison-Wesley Publishing Co., USA, 1993) and *OPENGL Reference Manual, The Official Reference Document for OPENGL*, Release 1, Silicon Graphics Inc. (Addison-Wesley Publishing Co., USA, 1992) (both of which are incorporated in their entirety herein by reference).

As shown in FIG. 7, graphics processing pipeline 700 consists of a graphic front end 702, a display list 704, an evaluator 706, a per-vertex operations and primitive assembly stage 708, a rasterization stage 710, a pixel operations stage 712, a texture memory 718, a per-fragment operations stage 712, a frame buffer 714, and a computer graphics display unit 720. Graphics commands 701 which are input to the graphics processing pipeline 700 (for example, from output buffer 212) can specify geometric objects to be drawn and control how the objects are handled during the various processing stages. Graphics front end 702 separates geometry type graphics commands and pixel (e.g., texture) type graphics commands such that the geometry related commands are provided to evaluator 706 and the pixel related commands are provided to pixel operations stage 716. Graphics commands can be processed immediately through the pipeline 700 or can be accumulated in display list 704 for processing at a later time.

Evaluator 706 approximates curve and surface geometry by evaluating polynomial commands of input values. During the next stage, per-vertex operations and primitive assembly stage 708 processes geometric primitives. Geometric primitives are points, line segments, triangles, and polygons, all of which are described by vertices. Vertices are transformed and lit, and primitives are clipped to a viewport in preparation for the rasterization stage 710.

Rasterization stage 710 produces a series of frame buffer addresses and associated values using a two-dimensional description of a point, line segment, triangle, or polygon. Each fragment produced in rasterization stage 710 is fed into the last stage, per-fragment operations stage 712. Per-fragment operations stage 712 performs the final operations on graphics data before the data is stored as pixels in frame buffer 714. These final operations can include conditional updates to the frame buffer 714 based on incoming and previously stored Z values for Z buffering, blending of incoming pixel colors with stored colors, masking, and other logical operations on pixel values.

Input graphics data 701 can be in the form of pixels rather than vertices. For example, an image used in texture mapping is processed in a pixel operation stage 704. Pixel operation stage 704 processes graphics data as pixels and stores a resulting texture map in texture memory 705. Rasterization stage 703 can then use the texture map stored in texture memory 718 for performing texture processing. The output from pixel operations stage 704 can also be applied directly to rasterization stage 703 and merged with resulting fragments into frame buffer 714 just as if the output was generated from geometric data.

Referring to the embodiment of FIG. 2, the graphics commands 701 being provided to graphics front end 701 can be transferred from output buffer 212. In other words, in one embodiment output buffer 212 is coupled to graphics front end 701.

Referring to the embodiment of FIG. 4, graphics commands can be send from GBS 204 to specific parts of graphics processing pipeline 700. For example, in one embodiment all geometry type graphics commands (i.e., vertices, normals, colors) 703 are transferred across a first bus 116A directly to a first part of pipeline 700 (which includes evaluator 706, and per-vertex operations and primitive assembly state 708), while all pixel type graphics commands (e.g., texture) 705 are transferred across a second bus 116B directly to a second part of pipeline 700 (which includes pixel operations stage 716). Alternatively, and/or additionally, graphics data such as streaming video 713 can be transferred directly to (or from) frame buffer 714. The streaming video 713 can be transferred through GBS 204 and across one of the plurality of busses 116A–116N or across a direct connection 218. Of course other graphics pipelines can be used without departing from the spirit and scope of the present invention.

5. Conclusion

By substantially increasing the bandwidth between system bridge 106 and graphics subsystem 102, the amount of local graphics memory (such as local texture memory 718 and/or frame buffer 714) of graphics subsystem 102 can be radically reduced. This is because the increased bandwidth enables graphics subsystem 102 to access system memory 108 with increased speed. This is beneficial because local graphics memory is substantially more expensive than system memory 108, is typically not scalable, and can not be used by other subsystems (subsystems outside of graphics subsystem 102) when not being fully utilized by graphics subsystem 102.

Previous attempts to increase the bandwidth to a graphics subsystem include the development of Intel's AGP, which is discussed above. However, although an AGP bus provides a relatively high bandwidth, the AGP bus can still become a bottleneck where a graphics subsystem can handle more graphics data than the AGP bus can deliver. The present invention can be used to even further increase bandwidth, and thus to avoid bottlenecks caused by a graphics bus.

SGI has included multiple graphics pipelines on many of its high end platforms (more specifically, these platforms include multiple graphics subsystems wherein each graphics subsystem includes its own dedicated graphics bus). This use of multiple graphics pipelines is aimed at increasing total graphics subsystem power. However, it does not increase the bandwidth to each of the multiple graphics subsystems. Accordingly, the present invention can be used to increase the bandwidth to each of the multiple graphics subsystems on SGI's high end platforms, enabling such platforms to fully utilize the power of each of the multiple graphics subsystems.

While various embodiments of the present invention have been described above, it should be understood that they have been presented by way of example only, and not limitation. It will be understood by those skilled in the art that various changes in form and details may be made therein without departing from the spirit and scope of the invention as defined in the appended claims. Thus, the breadth and scope of the present invention should not be limited by any of the above-described exemplary embodiments, but should be defined only in accordance with the following claims and their equivalents.

What is claimed is:

1. An apparatus for transferring multiple graphics commands, comprising:

a first buffer for temporarily storing the multiple graphics commands, wherein the multiple graphics commands have a specific order;

a plurality of busses; and a graphics bus scheduler coupled between said first buffer and said plurality of busses, wherein said graphics bus scheduler tags each of the multiple graphics commands with a respective tag that indicates said specific order of the multiple graphics commands, assigns each of the multiple graphics commands to a corresponding one of a plurality of busses, and transfers each of the multiple graphics commands to its assigned one of said plurality of busses, wherein said plurality of busses transfer the multiple graphics commands from said graphics bus scheduler; and a graphics bus de-scheduler that accepts the multiple graphics commands transferred across said plurality of busses, wherein the accepted multiple graphics commands do not necessarily have said specific order, wherein said graphics bus de-scheduler re-orders the accepted multiple graphics commands into said specific order by transferring the accepted multiple graphics commands into a second buffer according to said tags, such that the multiple graphics commands regain said specific order within said second buffer.

2. The apparatus of claim 1, wherein said graphics bus de-scheduler requests that one of the multiple graphics commands is retransferred by said graphics bus scheduler if said one of the multiple graphics commands is not accepted by said graphics bus de-scheduler within a predetermined amount of time.

3. The apparatus of claim 1, further comprising means for transferring the multiple graphics commands from said second buffer to a graphics subsystem.

4. The apparatus of claim 3, wherein the multiple graphics commands are transferred to said first buffer from a system bridge.

5. The apparatus of claim 4, further comprising a direct connection between the system bridge and the graphics subsystem, wherein said direct connection enables the graphics subsystem to send time critical messages to the system bridge.

6. The apparatus of claim 4, wherein the multiple graphics commands originate from a central processing unit (CPU) and/or a system memory, each of which is coupled to the system bridge.

7. The apparatus of claim 1, wherein said graphics bus scheduler assigns each of the multiple graphics commands to a corresponding one of said plurality of busses according to a type of command.

8. The apparatus of claim 1, wherein said graphics bus scheduler assigns the multiple graphics commands to said plurality of busses in such a manner as to create a pipeline effect across said plurality of busses.

9. The apparatus of claim 8, wherein said plurality of busses comprises a first bus and a second bus, and wherein said first graphics bus scheduler assigns a first graphics command of the multiple graphics commands to said first bus, a second graphics command of the multiple graphics commands to said second bus, a third graphics command of the multiple graphics commands to said first bus, and a forth graphics command of the multiple graphics commands to said second bus, to thereby create said pipeline effect across said plurality of busses.

10. The apparatus of claim 8, wherein said plurality of busses comprises a first bus, a second bus, and a third bus, and wherein said first graphics bus scheduler assigns a first graphics command of the multiple graphics commands to said first bus, a second graphics command of the multiple graphics commands to said second bus, a third graphics command of the multiple graphics commands to said third bus, a forth graphics command of the multiple graphics commands to said first bus, a fifth graphics command of the multiple graphics commands to said second bus, and a sixth graphics command of the multiple graphics commands to said third bus, to thereby create said pipeline effect across said plurality of busses.

11. The apparatus of claim 1, wherein the multiple graphics commands comprise application program interface (API) commands.

12. An apparatus for transferring multiple graphics commands, comprising:
   a first buffer for temporarily storing the multiple graphics commands,
   wherein the multiple graphics commands have a specific order;
   a plurality of busses;
   and graphics bus scheduler coupled between said first buffer and said plurality of busses,
   wherein said graphics bus scheduler tags each of the multiple graphics commands with a respective tag that indicates said specific order of the multiple graphics commands, assigns each of the multiple graphics commands to a corresponding one of a plurality of busses, and transfers each of the multiple graphics commands to its assigned one of said plurality of busses,
   wherein said plurality of busses transfer the multiple graphics commands from said graphics bus scheduler,
   wherein said graphics bus scheduler assigns each of the multiple graphics commands to a corresponding one of said plurality of busses according to a type of command, and
   wherein said graphics bus scheduler assigns geometry related graphics commands to a first bus of said plurality of busses.

13. The apparatus of claim 12, wherein said graphics bus scheduler assigns texture related graphics commands to a second bus of said plurality of busses.

14. A method for transferring multiple graphics commands, comprising the steps of:
   buffering the multiple graphics commands, wherein the buffered multiple graphics commands have a specific order;
   tagging each of the multiple graphics commands with a respective tag, said tags indicating said specific order of the buffered multiple graphics commands;
   assigning each of the tagged multiple graphics commands to a corresponding one of a plurality of busses;
   transferring the tagged multiple graphics commands across said plurality of busses, such that each of the tagged multiple graphics commands is transferred across its assigned one of said plurality of busses;
   buffering the multiple graphics commands after they are transferred across said plurality of busses, wherein the accepted multiple graphics commands do not necessarily have said specific order; and
   re-ordering the accepted multiple graphics commands in the buffer into said specific order based on said tags.

15. The method of claim 14, further comprising the step of:
   transferring the re-ordered multiple graphics commands to a graphics subsystem.

16. The method of claim 14, further comprising the step of requesting that one of the multiple graphics commands is retransferred if said one of the multiple graphics commands is not accepted within a predetermined amount of time.

17. The method of claim 14, wherein said assigning step comprises assigning each of the multiple graphics commands to one of said plurality of busses according to a type of command.

18. The method of claim 17, wherein said assigning step comprises assigning geometry related graphics commands to a first bus of said plurality of busses.

19. The method of claim 18, wherein said assigning step further comprises assigning texture related graphics commands to a second bus of said plurality of busses.

20. The method of claim 14, wherein said assigning step comprises assigning said multiple graphics commands to said plurality of busses such that a pipeline effect is created across said plurality of busses.

21. The method of claim 20, wherein said plurality of busses comprises a first bus and a second bus, and wherein said assigning step comprises assigning a first graphics command of the multiple graphics commands to said second bus, to thereby create said pipeline effect across said plurality of busses.

22. The method of claim 20, wherein said plurality of busses comprises a first bus, a second bus, and a third bus, and wherein said assigning step comprises assigning a first graphics command of the multiple graphics commands to said first bus, a second graphics command of the multiple graphics commands to said second bus, a third graphics command of the multiple graphics commands to said third bus, a forth graphics command of the multiple graphics commands to said first bus, a fifth graphics command of the multiple graphics commands to said second bus, and a sixth graphics command of the multiple graphics commands to said third bus, to thereby create said pipeline effect across said plurality of busses.

23. The method of claim 14, wherein the multiple graphics commands comprise application program interface (API) commands.

24. A method for transferring multiple graphics commands, comprising the steps of:
   buffering the multiple graphics commands, wherein the buffered multiple graphics commands have a specific order;
   tagging each of the multiple graphics commands with a respective tag, said tags indicating said specific order of the buffered multiple graphics commands;
   assigning each of the tagged multiple graphics commands to a corresponding one of a plurality of busses;
   transferring the tagged multiple graphics commands across said plurality of busses, such that each of the tagged multiple graphics commands is transferred across its assigned one of said plurality of busses;
   accepting the multiple graphics commands after they are transferred across said plurality of busses, wherein the accepted multiple graphics commands do not necessarily have said specific order; and
   re-ordering the accepted multiple graphics commands into said specific order based on said tags;
   wherein the buffered multiple graphics commands were transferred from a system bridge.

25. The method of claim 24, further comprising the step of sending time critical messages from the graphics subsystem to the system bridge across a direct connection between the system bridge and the graphics subsystem.

26. The apparatus of claim 24, wherein the multiple graphics commands originate from a central processing unit (CPU) and/or a system memory, each of which is coupled to the system bridge.

27. An apparatus for transferring multiple graphics commands between a system bridge and a graphics subsystem, comprising:
   a graphics bus scheduler for receiving multiple graphics commands from a system bridge and for assigning each of the multiple graphics commands to one of a plurality of busses; and
   said plurality of busses for transferring the multiple graphics commands between said graphics bus scheduler and the graphics subsystem, wherein each of the multiple graphics commands is transferred across its assigned one of said plurality of busses.

28. The apparatus of claim 27, wherein each of the plurality of busses transfers the multiple graphics commands that are assigned to that bus directly to a specific functional component of the graphics subsystem.

29. The apparatus of claim 28, wherein said graphics bus scheduler assigns each of the multiple graphics commands to one of said plurality of busses according to a type of command.

30. The apparatus of claim 29, wherein said graphics bus scheduler assigns geometry related graphics commands to a first bus of said plurality of busses.

31. The apparatus of claim 30, wherein said graphics bus scheduler assigns texture related graphics commands to a second bus of said plurality of busses.

32. The apparatus of claim 31, wherein said first bus provides said geometry related graphics commands to a functional component of the graphics subsystem that performs geomety operations.

33. The apparatus of claim 32, wherein said first bus provides said texture related graphics commands to a functional component of the graphics subsystem that performs pixel operations.

34. A method for transferring multiple graphics commands between a system bridge and a graphics subsystem, comprising the steps of:
   receiving multiple graphics commands from a system bridge;
   assigning each of the multiple graphics commands to one of a plurality of busses that are coupled to the graphics subsystem; and
   transferring the multiple graphics commands across said plurality of busses, wherein each of the multiple graphics commands is transferred across its assigned one of said plurality of busses.

35. The method of claim 34, wherein each of the plurality of busses transfers the multiple graphics commands that are assigned to that bus directly to a specific functional component of the graphics subsystem.

36. The method of claim 35, wherein said step of assigning comprises assigning each of the multiple graphics commands to one of said plurality of busses according to a type of command.

37. The method of claim 36, wherein said step of assigning further comprises assigning geometry related graphics commands to a first bus of said plurality of busses.

38. The method of claim 37, wherein said step of assigning further comprises assigning texture related graphics commands to a second bus of said plurality of busses.

39. The method of claim 38, wherein said step of transferring comprises transferring said geometry related graphics commands to a functional component of the graphics subsystem that performs geometry operations.

40. The method of claim 39, wherein said step of transferring further comprises transferring said texture related graphics commands to a functional component of the graphics subsystem that performs pixel operations.

41. An apparatus for transferring multiple graphics commands between a stem bridge and a graphics subsystem, comprising:
   an first buffer for temporarily storing the multiple graphics commands that are transferred to said first buffer from the system bridge, wherein the multiple graphics commands have a specific order;
   a graphics bus scheduler for
      tagging each of the multiple graphics commands with tags, said tags indicating said specific order of the multiple graphics commands,
      assigning each of the multiple graphics commands to one of a plurality of busses, and
      transferring each of the multiple graphics commands from the first buffer to its assigned one said plurality of busses;
   said plurality of busses for transferring the multiple graphics commands between said graphics bus scheduler and a graphics bus de-scheduler;
   said graphics bus de-scheduler for
      accepting the multiple graphics commands transferred across said plurality of busses, wherein the accepted multiple graphics commands do not necessarily have said specific order, and
      transferring the accepted multiple graphics commands into a second buffer according to said tags, such that the multiple graphics commands regain said specific order within said second buffer; and
   means for transferring the multiple graphics commands from said second buffer to the graphics subsystem.

42. A method for transferring multiple graphics commands between a system ridge and a graphics subsystem, comprising:
   buffering the multiple graphics commands that are transferred from the system bridge, wherein the buffered multiple graphics commands have a specific order;
   tagging each of the multiple graphics commands with tags, said tags indicating said specific order of the buffered multiple graphics commands;
   assigning each of the tagged multiple graphics commands to one of a plurality of busses;
   transferring the tagged multiple graphics commands across said plurality of busses, such that each of the tagged multiple graphics commands is transferred across its assigned one of said plurality of busses;
   accepting the multiple graphics commands after they are transferred across said plurality of busses, wherein the accepted multiple graphics commands do not necessarily have said specific order;
   transferring the accepted multiple graphics commands into a buffer according to said tags, such that the multiple graphics commands regain said specific order within said buffer; and
   transferring the multiple graphics commands from said buffer to the graphics subsystem.

* * * * *